(12) United States Patent
Yalovsky et al.

(10) Patent No.: US 7,366,500 B1
(45) Date of Patent: Apr. 29, 2008

(54) SMS SHORTHAND DICTIONARY SERVICE

(75) Inventors: David Yalovsky, Seattle, WA (US);
Mohamed Anas Abbar, Redmond, WA (US); Athapan Arayasantiparb, Redmond, WA (US); Diane Malone, Redmond, WA (US)

(73) Assignee: Microsoft Corporation, Remond, WA (US)

( * ) Notice: Subject to any disclaimer, the term of this patent is extended or adjusted under 35 U.S.C. 154(b) by 85 days.

(21) Appl. No.: 10/808,620

(22) Filed: Mar. 23, 2004

(51) Int. Cl.
*H04M 3/42* (2006.01)
*G06F 15/00* (2006.01)

(52) U.S. Cl. .................. 455/414.1; 455/466; 715/531; 715/534

(58) Field of Classification Search ............... 455/466, 455/414.1; 704/3, 2, 260, 8; 709/247; 340/7.31; 715/531–534, 540; 707/10; 345/156, 160
See application file for complete search history.

(56) References Cited

U.S. PATENT DOCUMENTS

| 5,623,406 | A  | * | 4/1997  | Ichbiah ........................... 704/3 |
| 6,473,621 | B1 | * | 10/2002 | Heie ............................. 455/466 |
| 6,785,869 | B1 | * | 8/2004  | Berstis ......................... 715/532 |
| 6,934,767 | B1 | * | 8/2005  | Jellinek ........................ 709/247 |
| 2002/0193996 | A1 |   | 12/2002 | Squibbs et al. ............. 704/260 |
| 2002/0198715 | A1 |   | 12/2002 | Belrose ....................... 704/266 |
| 2003/0023424 | A1 | * | 1/2003  | Weiner ........................... 704/8 |
| 2004/0122979 | A1 | * | 6/2004  | Kirkland ...................... 709/247 |

OTHER PUBLICATIONS

Rebecca E. Grinter et al.; "Wan2tlk?: Everyday Text Messaging"; Apr. 5-10, 2003; vol. No. 5, Issue No. 1; pp. 441-448, Apr. 5, 2003.
Lee Butts et al.; "An Evaluation of Mobile Phone Text Input Methods"; pp. 55-59.
Mark D. Dunlop et al.; "Predictive Text Entry Methods for Mobile Phones"; pp. 1-10.
Jon Hasselgren et al; HMS: A Predictive Text Entry Method Using Bigrams; 7 pages.

* cited by examiner

*Primary Examiner*—George Eng
*Assistant Examiner*—Nam Huynh
(74) *Attorney, Agent, or Firm*—Merchant & Gould P.C.

(57) ABSTRACT

The present invention provides a lookup service for shorthand terms directly from within an application. A lookup pane is provided to the user from which they can lookup a definition for the shorthand term. The lookup pane provides a consistent user interface for looking up shorthand terms from within a suite of applications. After entering a shorthand term, a dictionary of shorthand terms is accessed to determine the definition. If desired, the user can choose to insert the definition of the term directly into a document. The lookup service is provided directly to the user without the user having to open a web page and search for the term.

21 Claims, 11 Drawing Sheets

SMS SHORTHAND DICTIONARY SERVICE

BACKGROUND OF THE INVENTION

Short Message Service (SMS) text messaging and Instant Messaging (IM) have emerged as extremely popular ways of communicating. In order to more efficiently send messages, many SMS and IM users communicate with their mobile device using a shorthand form of SMS. The SMS shorthand allows the users to abbreviate terms when communicating in text via mobile phones or instant messaging applications, thereby saving keystrokes. Deciphering these shorthand terms, however, can be quite confusing since many terms can be unique to language, location or culture.

SUMMARY OF THE INVENTION

The present invention is related to providing a lookup service for shorthand terms directly from within an application.

According to one aspect of the invention, a shorthand term to be defined is entered directly from within an application the user is currently using. The user may enter the shorthand term within a search box or obtain the shorthand term directly from within the application.

According to another aspect of the invention, a dictionary of shorthand terms is accessed to determine the definition. More than one dictionary may be accessed and the dictionaries may be in different languages.

According to yet another aspect of the invention, the user can select a definition and insert that definition directly into the application.

DETAILED DESCRIPTION OF THE PREFERRED EMBODIMENT

Generally, the present invention is related to providing a lookup service for shorthand terms directly from within an application. A lookup pane is provided to the user from which they can lookup a definition for the shorthand term. The lookup pane is directed at providing a consistent user interface for looking up shorthand terms from within a suite of applications. After entering a shorthand term, a dictionary of shorthand terms is accessed to determine the definition. If desired, the user can choose to insert the definition of the term directly into a document. The lookup service is provided directly to the user without the user having to open a web page and search for the term.

Illustrative Operating Environment

Figure 1:
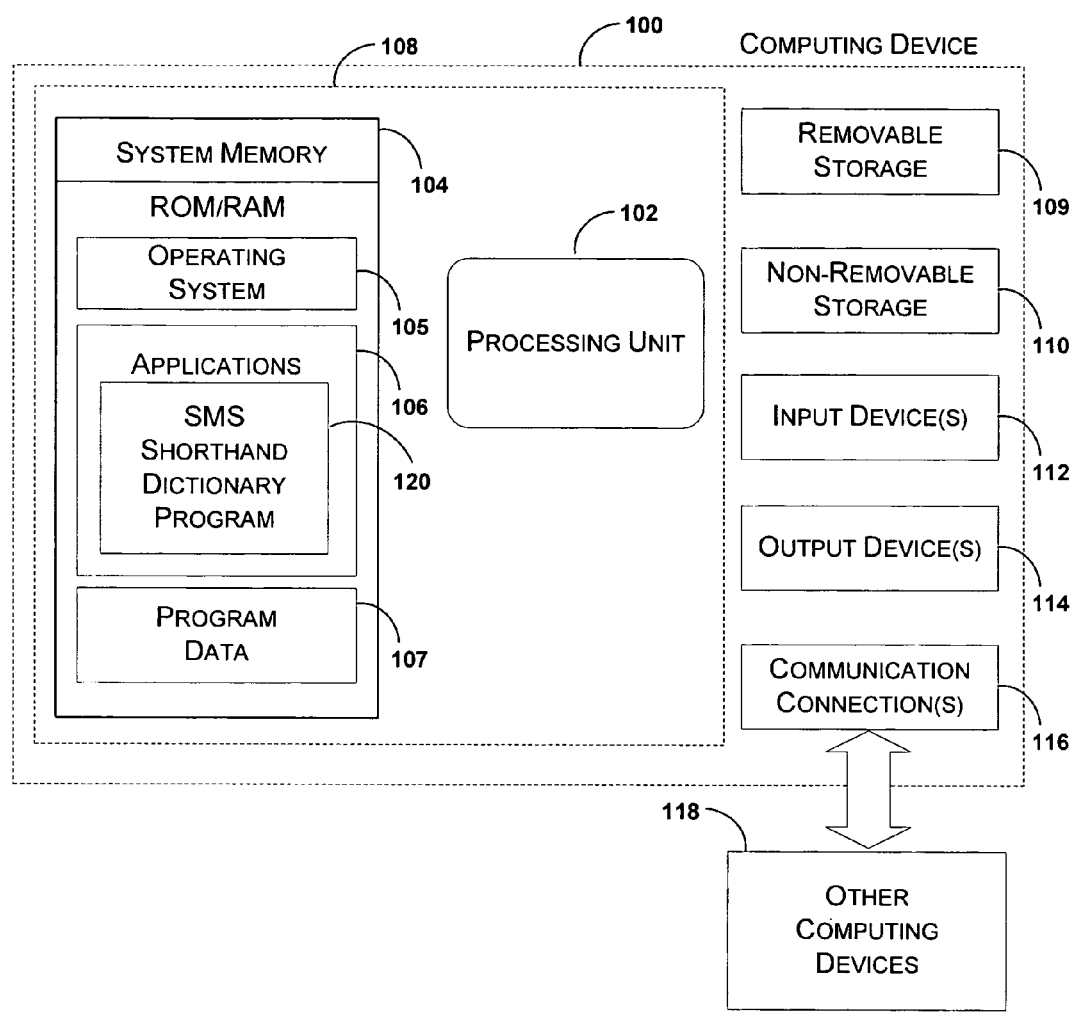
FIGS. 1 and 2 illustrate an exemplary computing devices that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include an SMS shorthand dictionary program 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Figure 2:
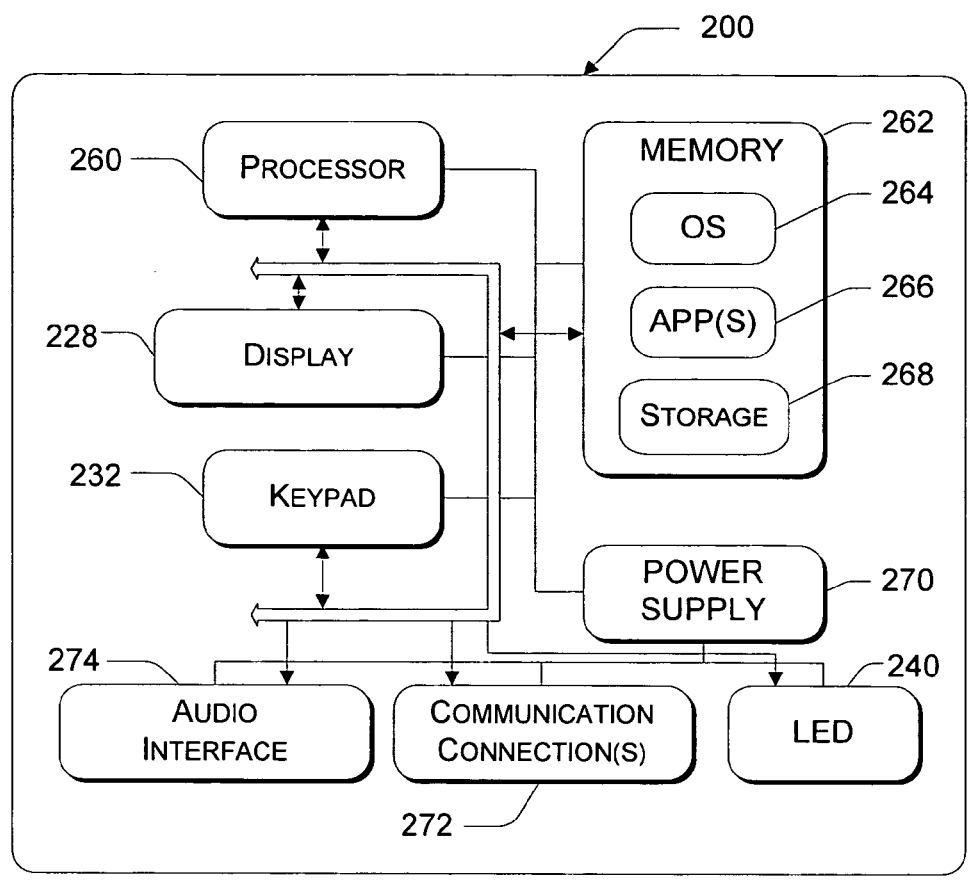

FIG. 2 illustrates a mobile computing device that may be used in one exemplary embodiment of the present invention. With reference to FIG. 2, one exemplary system for implementing the invention includes a mobile computing device, such as mobile computing device 200. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on the operating system 264. An SMS shorthand dictionary application resides on mobile computing device 200 and is programmed to perform instructions relating to looking up SMS shorthand terms. The SMS shorthand dictionary application may reside in the hardware or software of the device. Mobile computing device 200 also includes non-volatile storage 268 within memory 262. Non-volatile storage 268 may be used to store persistent information which should not be lost if mobile computing device 200 is powered down.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes communications connection(s), such as a wireless interface layer, that performs the function of transmitting and receiving communications. Communications connection 272 facilitates wireless connectivity between the mobile computing device 200 and the outside world. According to one embodiment, transmissions to and from communications connection 272 are conducted under control of the operating system 264.

Illustrative SMS Shorthand Dictionary Research System

Figure 3:
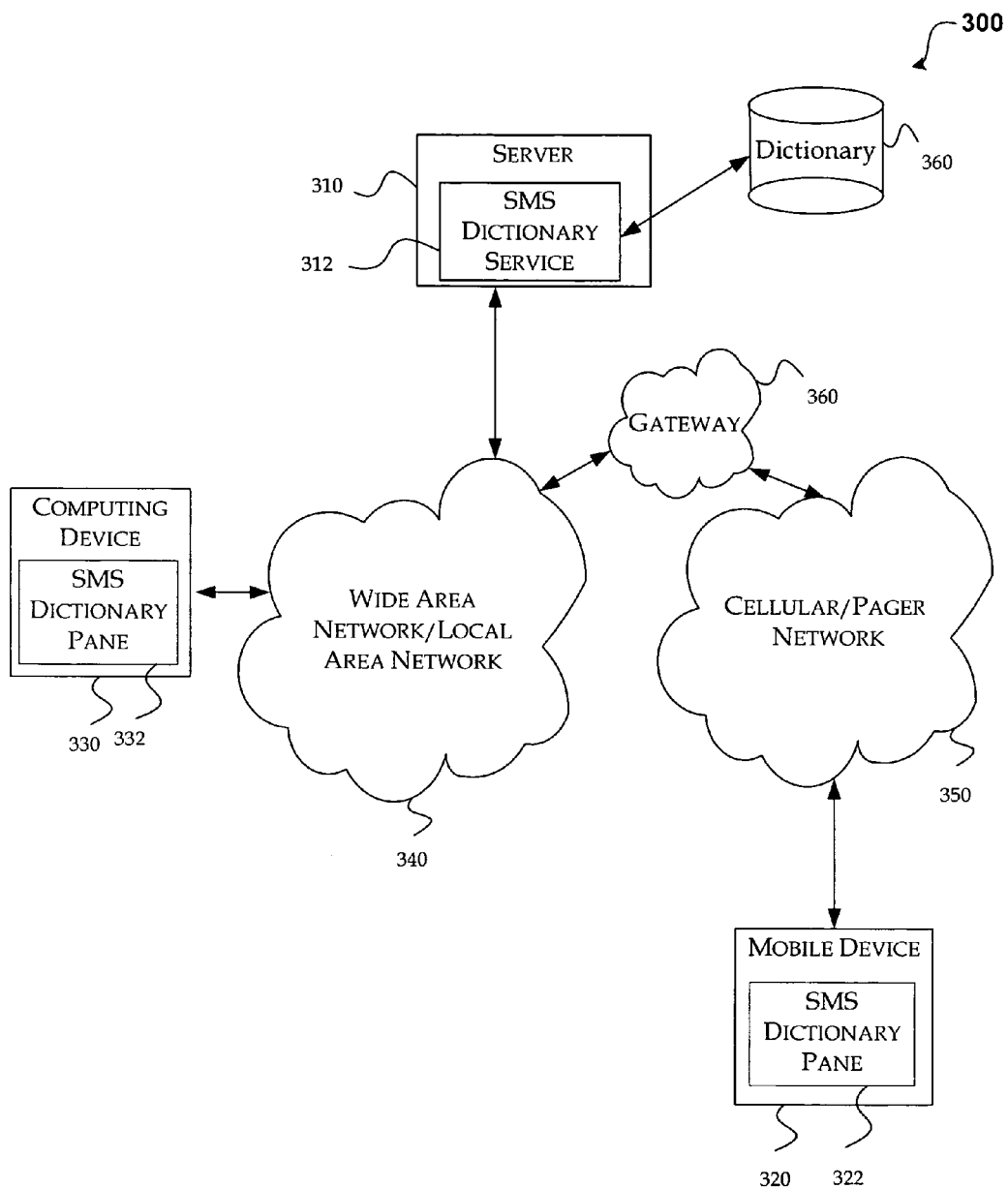
FIG. 3 is a functional block diagram generally illustrating an SMS dictionary lookup system.

FIG. 3 is a functional block diagram generally illustrating an SMS dictionary lookup system 300, in accordance with aspects of the invention. Server 310 and computing device 330 are computing devices such as the one described above in conjunction with FIG. 1 and mobile device 320 is a mobile computing device such as the one described above in conjunction with FIG. 2.

Generally, SMS shorthand refers to abbreviated terms that people use when communicating in text via mobile phones or instant messaging (IM) applications. Users may also use SMS shorthand when constructing documents within applications. Although these shorthand abbreviations used do not conform to any official standard, a set of 'well known' and 'lesser known' terms have emerged. Such term sets can be unique to language or locale or culture. To the user unfamiliar with a shorthand term, deciphering it can be quite confusing.

One particular annoyance for users utilizing shorthand terms is that a person may receive a message in shorthand that they can not decrypt. To make the common shorthand abbreviations more accessible the SMS shorthand lookup system is directed at retrieving the definition of an abbreviated shorthand term directly from within an application the user is currently using.

A user may lookup SMS shorthand terms on devices 320 and/or 332 using SMS dictionary pane 322 and 332 directly from within an application. SMS dictionary pane 322 and 332 residing on mobile device 320 and computing device 330 is configured to retrieve the definition of requested shorthand terms. While the description herein refers to SMS shorthand, other forms of shorthand may also be used.

According to one embodiment, a word-processor application on device 320 or 330 is configured to retrieve the definition of SMS shorthand terms using SMS dictionary pane 322, 332. SMS dictionary pane 322 and 332 is configured to communicate with server 310 to obtain the definition of shorthand terms. Applications 322 and 332 and SMS dictionary service 312 may communicate using any one of several client-server protocols.

Server 310 runs SMS dictionary service 312. SMS dictionary service 312 is configured to provide the definitions of requested shorthand terms. According to one embodiment, the shorthand terms and their definitions are stored in dictionary 360 as XML. The terms and their associated definitions may be transmitted over wide area network (WAN)/local area network (LAN) 340. The clients may also add shorthand terms to a custom dictionary. According to one embodiment, the custom list is maintained locally on the client. The custom dictionary may also be maintained by server 310.

Cellular/pager network 350 is a network responsible for delivering messages to and receiving messages from wireless devices. The cellular/pager network 350 may include both wireless and wired components. For example, cellular/pager network may include a cellular tower that is linked to a wired telephone network. Typically, the cellular tower carries communication to and from cell phones, long-distance communication links, and the like.

Gateway 360 routes messages between cellular/pager network 350 and WAN/LAN 340. For example, a computer user may send a message that is addressed to a cellular phone. Gateway 360 provides a means for transporting the message from the WAN/LAN 340 to cellular/pager network 350. Conversely, a user with a device connected to a cellular network may be browsing the Web. Gateway 360 allows hyperlink text protocol (HTTP) messages to be transferred between WAN/LAN 340 and cellular/pager network 350.

Figure 4:
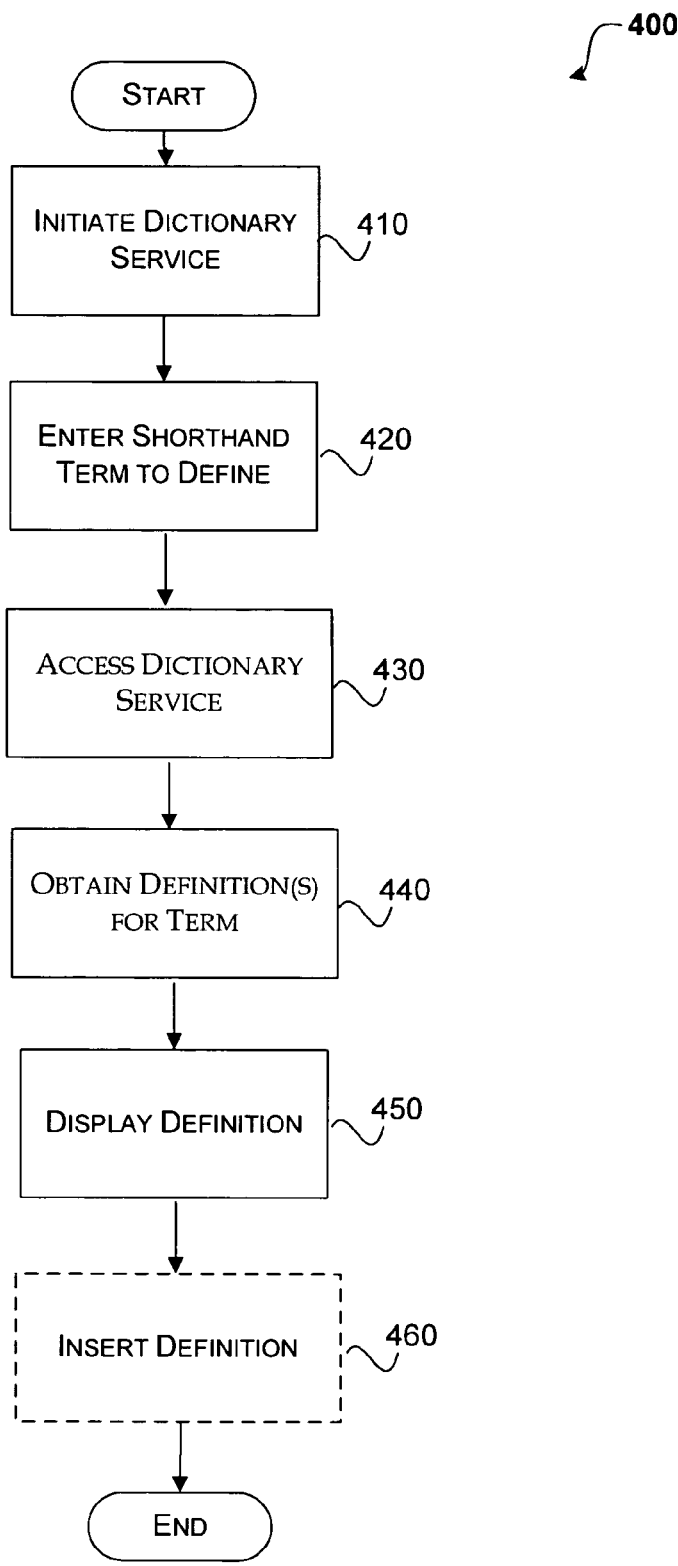
FIG. 4 illustrates a process flow for looking up a shorthand term from a dictionary service.

FIG. 4 illustrates a process flow for looking up a shorthand term from a dictionary service, in accordance with aspects of the invention.

After a start block the process flows to block 410 where the user initiates a shorthand dictionary service. According to one embodiment, the user selects a menu item within a word-processing application that displays a lookup pane for the user to enter shorthand terms and view their definition.

The user is able to access the lookup service directly from within the application.

Transitioning to block 420, a shorthand term is entered to lookup the definition. According to one embodiment, the user enters the shorthand term directly within a search box in the lookup pane. The user may also select a word directly from within a document to lookup the definition.

Flowing to block 430, the dictionary service is accessed. According to one embodiment, the dictionary service is located on the Internet. The dictionary service may also be located on the individuals local computing device as well as on a local server.

Moving to block 440, the definition is obtained for the entered shorthand term. A dictionary is scanned to determine the meaning(s) for the term. More than one dictionary may be scanned.

Next, at block 450, the definition(s) is displayed. According to one embodiment, the definition(s) are displayed within the lookup pane below the entered shorthand term.

Transitioning to block 460, a selected definition may be inserted into the current application. For example, the user may lookup the shorthand term "brb" and then select the definition "be right back" to insert into their document at the current cursor position. The process then flows to an end block.

Figure 5:
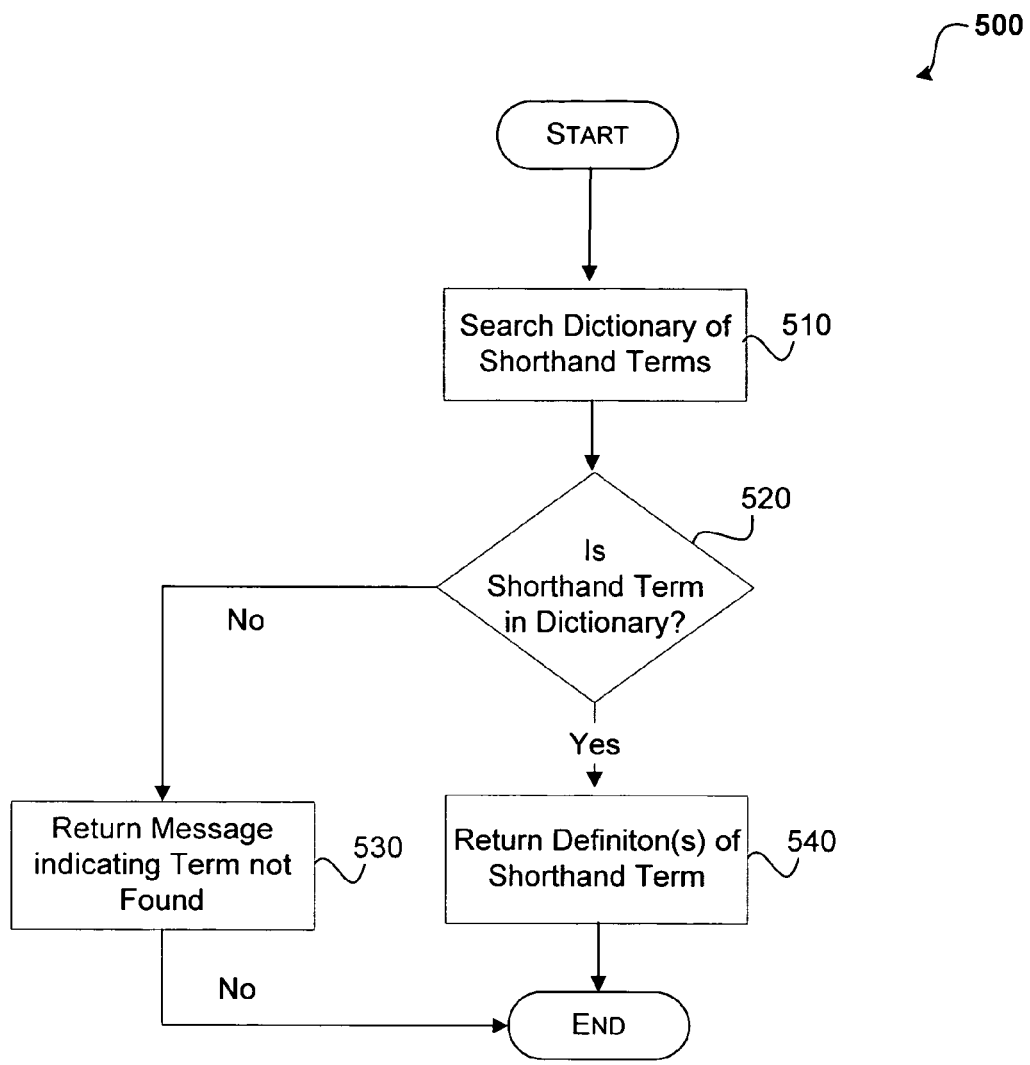
FIG. 5 shows a process for searching for a shorthand definition.

FIG. 5 shows a process for searching for a shorthand definition, in accordance with aspects of the invention. After a start block, the process moves to block 510, where a dictionary is searched to find the definition of the shorthand term. According to one embodiment, the dictionary is maintained of words within the highlighted text is processed one word at a time.

Flowing to decision block 530, a determination is made as to whether the shorthand term is located in the dictionary.

When the abbreviation is not in the dictionary, the process moves to block 530, where an error message is returned to the lookup pane indicating that the term was not located.

When the abbreviation is in the dictionary, the process moves to block 540 where the definition for the shorthand term is returned to the lookup pane. If multiple definitions exist for a particular SMS Shorthand term then multiple results will be returned in a list.

The process then moves to an end block.

Figure 6:
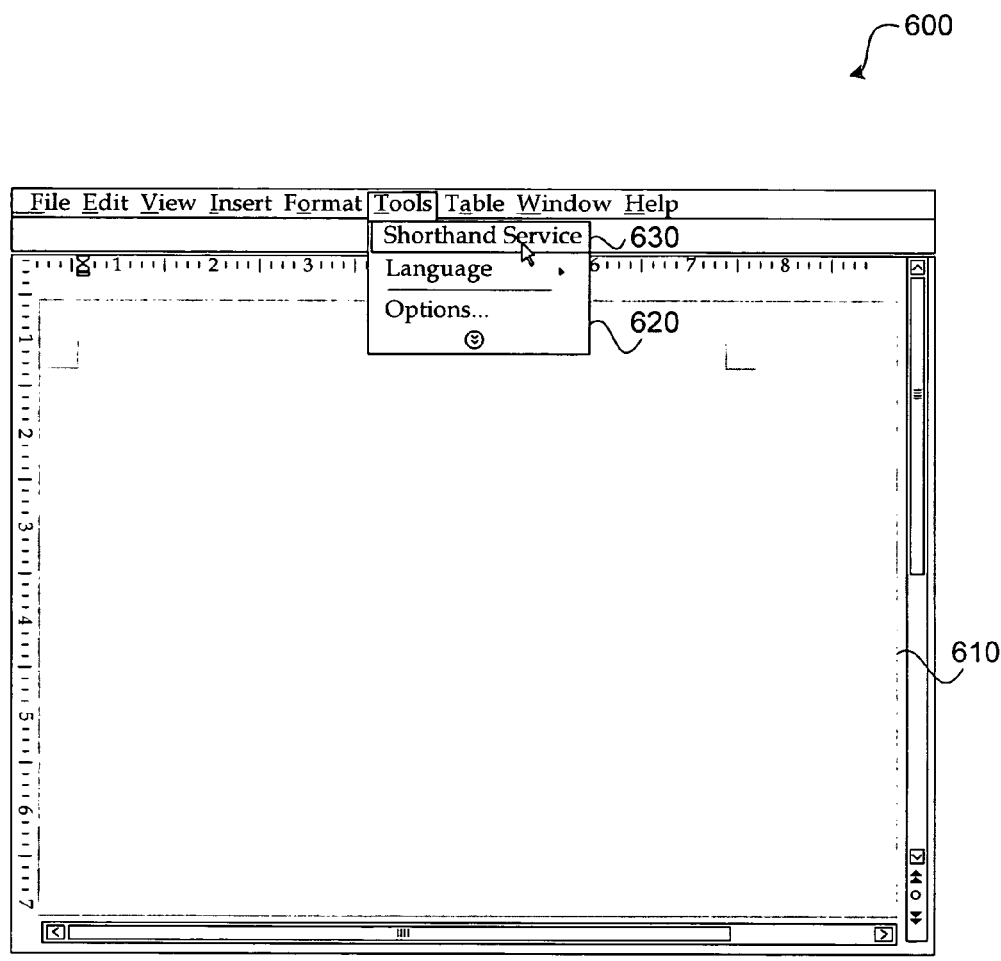
FIG. 6 illustrates an exemplary word-processing screen starting a shorthand dictionary service.

FIG. 6 illustrates an exemplary word-processing screen starting a shorthand dictionary service, in accordance with aspects of the invention. As illustrated, screen 600 includes a writing area 610 and menu 620. According to one embodiment, shorthand service menu item 630 located within menu 620 is selected to start the shorthand dictionary service. Upon selecting shorthand service menu item 630 a lookup pane is presented to the user.

Figure 7:
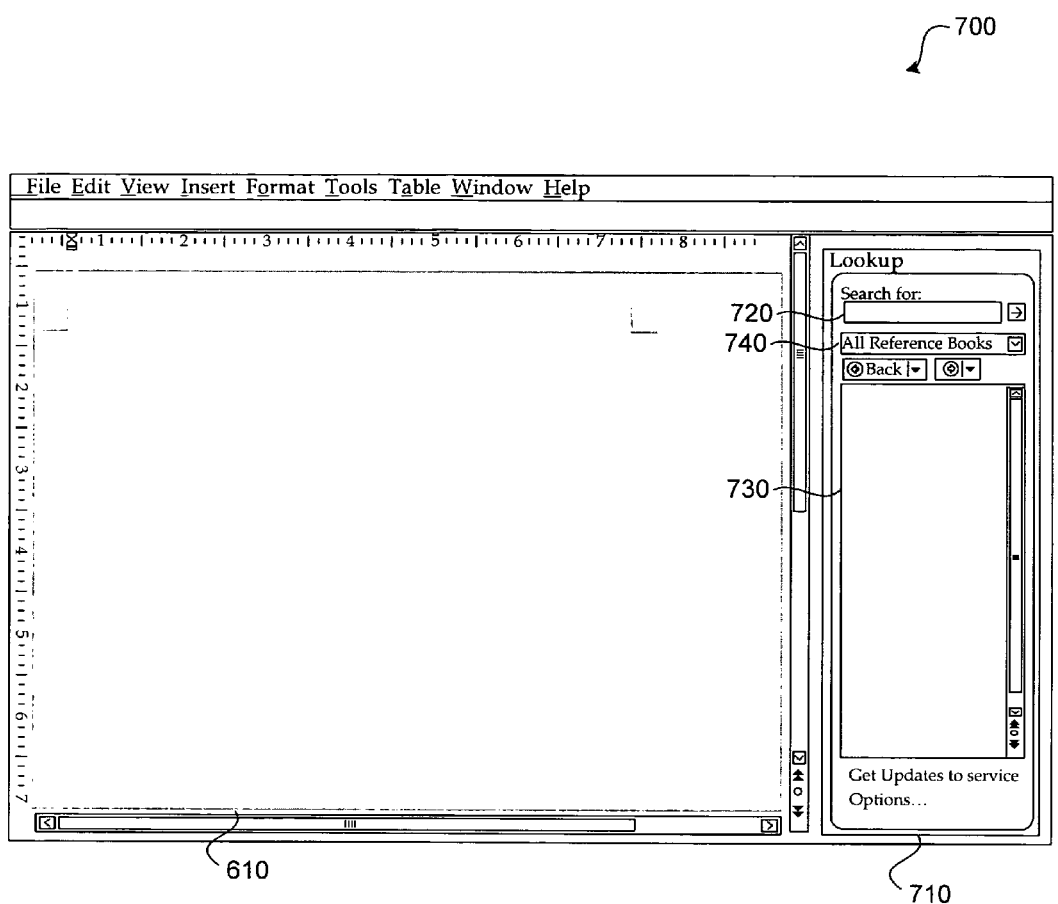
FIG. 7 shows an exemplary application screen showing a lookup pane.

FIG. 7 shows an exemplary application screen showing a lookup pane, in accordance with aspects of the invention. Screen 700 includes lookup pane 710, search box 720, list box 730 and writing area 610. Selecting the reference books pull down menu (740) shows the user a list of available services that may be searched.

Figure 8:
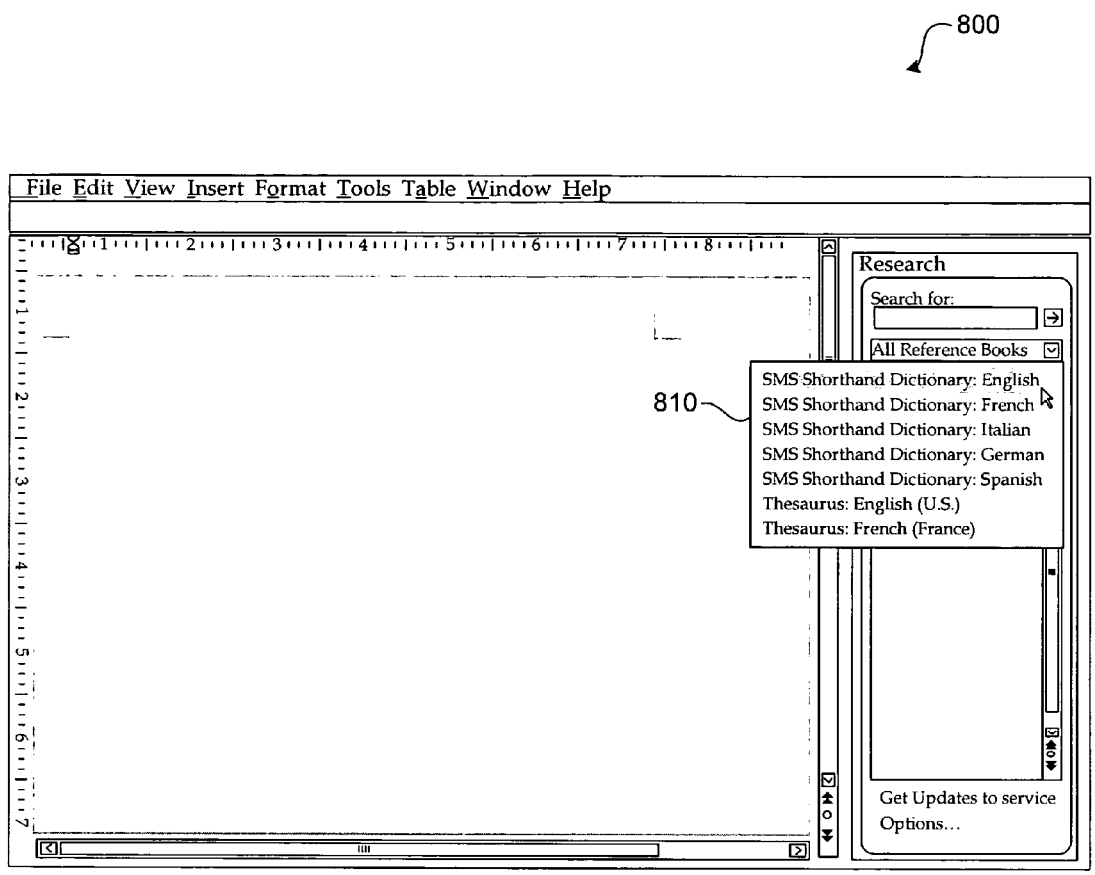
FIG. 8 illustrates an exemplary list of shorthand dictionaries, as well as other services, available to the user.

FIG. 8 illustrates an exemplary list of shorthand dictionaries, as well as other services, available to the user, in accordance with aspects of the present invention. Screen 800 shows menu 810 which provides the user with a selectable list of dictionaries which are then used to find the definition of a shorthand term. One or more of the dictionaries may be selected and used. After selecting the SMS shorthand dictionary: English menu item, the user may search for definitions within that dictionary.

Figure 9:
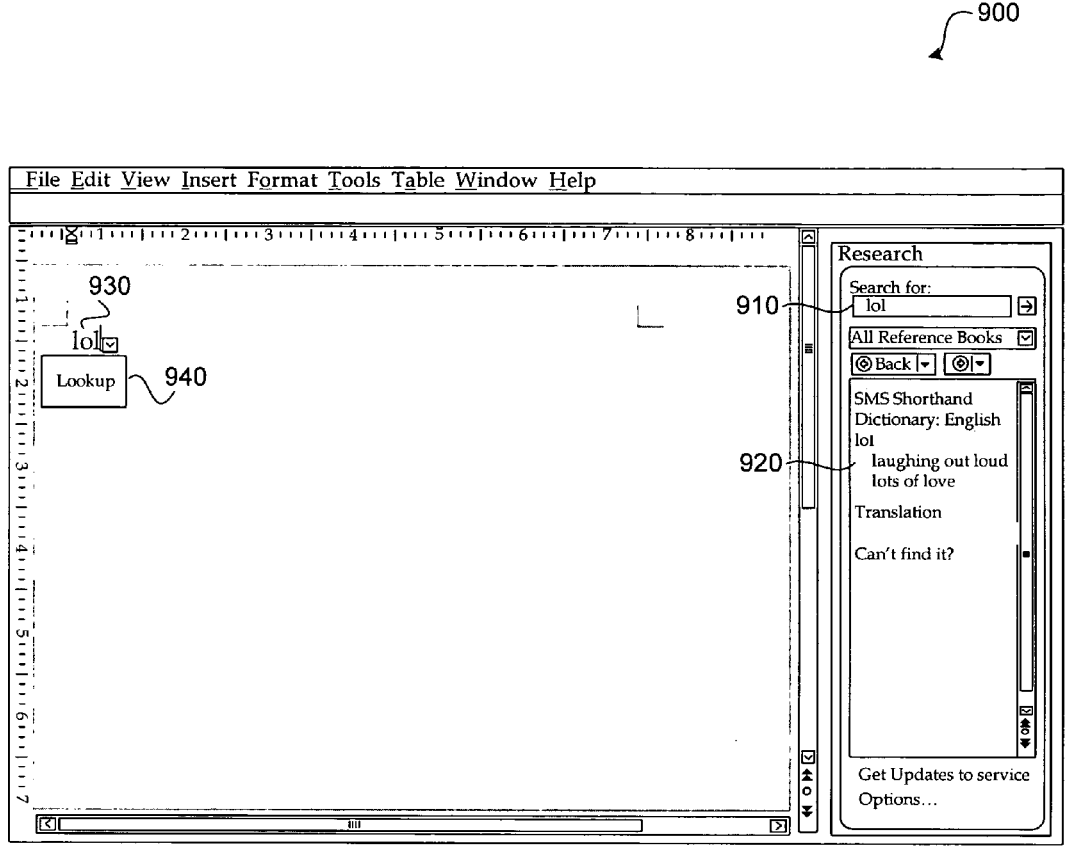
FIG. 9 shows an exemplary shorthand term definition search.

FIG. 9 shows an exemplary shorthand term definition search, in accordance with aspects of the present invention. Screen 900 includes search box 910 list box 920, text 930, and menu 940.

According to one embodiment of the invention, the user may enter a shorthand term into search box 910. In the present example, the user has input the shorthand term "lol" into search box 910.

According to another embodiment, the user may select a shorthand term to lookup the definition for within a writing area. In the present example, the user right clicks on the shorthand term "lol" (930) and then selects the lookup item on menu 940 to begin the search.

After entering the term, an attempt is made to find the shorthand term within the selected dictionaries. According to the present example, the SMS Shorthand Dictionary (English Version) is searched. The results of the dictionary search is provided to the user in list box 920. The present search resulted in two potential definitions for "lol." The first definition "laughing out loud" and the second definition "lots of love."

Figure 10:
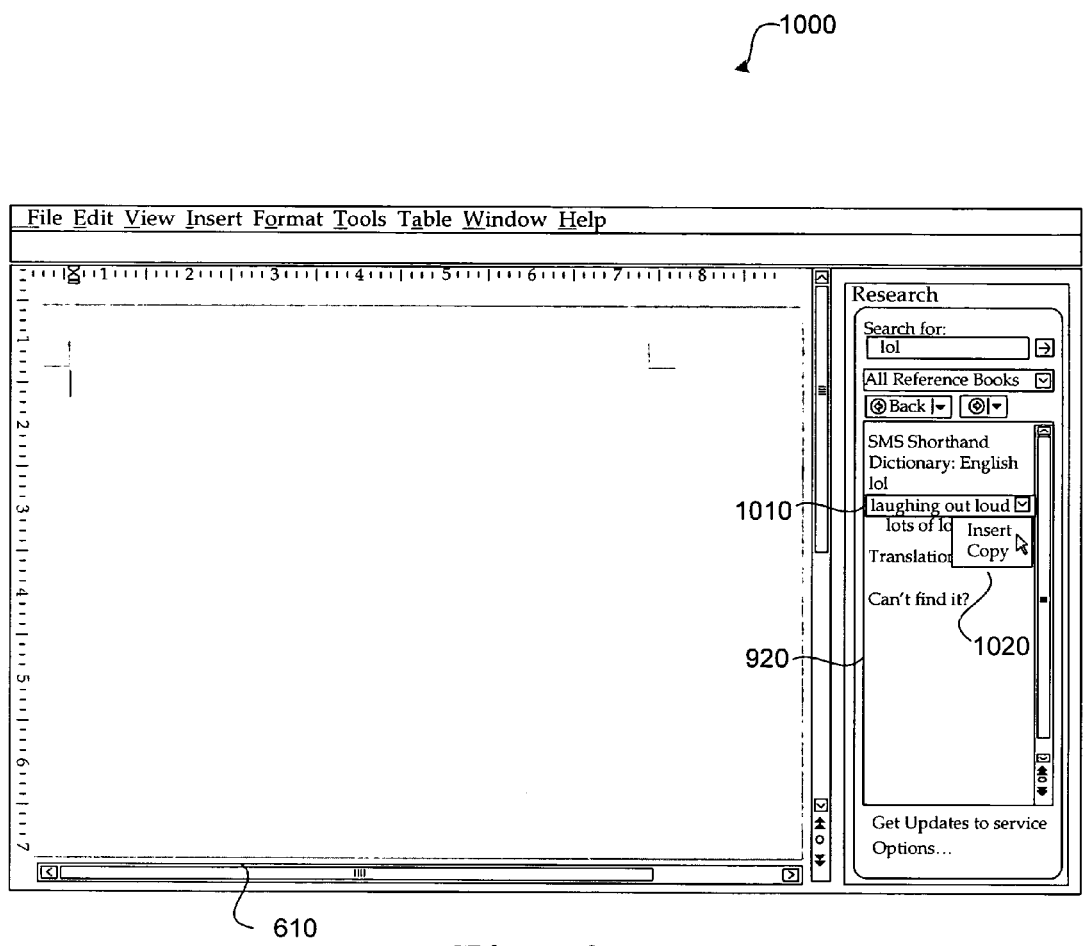
FIG. 10 illustrates selecting a definition of a shorthand term.

FIG. 10 illustrates selecting a definition of a shorthand term, in accordance with aspects of the invention. According to one embodiment, right-clicking on a definition of a shorthand term displayed in list box 920 provides the user with a drop down menu (1010) having two menu options. The menu options include the option to insert the definition into writing area 610 at the current cursor location and the option to copy the definition for later use. According to the present example, the user has selected the laughing out loud definition for "lol" and has the cursor located over the insert menu option.

Figure 11:
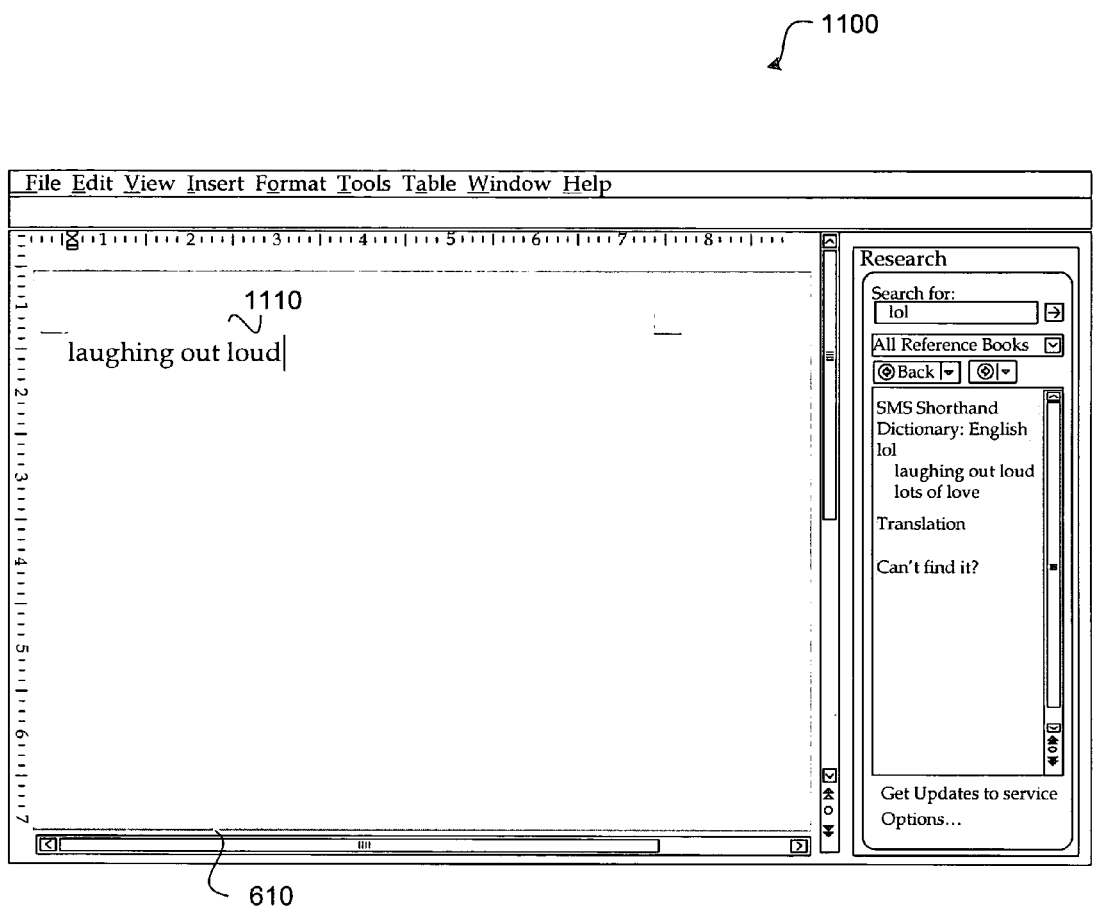
FIG. 11 shows inserting a definition of a shorthand term into a writing window, in accordance with aspects of the invention.

FIG. 11 shows inserting a definition of a shorthand term into a writing window, in accordance with aspects of the present invention. As illustrated the text laughing out loud (1110) is inserted into writing area 610.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for utilizing a shorthand term dictionary service, comprising:

initiating a shorthand dictionary service from within a document creation application;

entering a shorthand term to be defined directly from within the document creation application; wherein the document creation application includes a first window that includes a writing area and a second window that includes a search box and a list box that are displayed in response to the shorthand dictionary service being initiated and after the first window is displayed;

displaying a list of available dictionary services within the second window;

receiving a selection from the displayed list of available dictionary services that indicates a dictionary service to search for the shorthand term;

determining when the shorthand term is entered in the search box of the second window; and when the shorthand term is entered within the search box of the second window performing actions, including:

accessing the dictionary service;

attempting to obtain a definition of the shorthand term;

displaying the definition of the shorthand term within the list box of the second window without replacing the shorthand term entered in the search box; and inserting the definition into the writing area of the first window at a current cursor position within the writing area of the document creation application; and determining when the shorthand term is entered within the writing area of the first window; wherein determining when the shorthand term is entered within the writing area of the first window includes receiving a selection indicating to define the shorthand term; and when the shorthand term is entered within the writing area of the first window, performing actions, including:

accessing the dictionary service;

attempting to obtain a definition of the shorthand term;

displaying the definition of the shorthand term within the list box of the second window;

receiving a selection of the definition of the shorthand term within the list box of the second window;

in response to the selection of the definition of the shorthand term, providing a first option to insert the selected definition into the first window at a current cursor position within the writing area and providing a second option to copy the selected definition;

determining when the first option is selected and when the first option is selected inserting the definition into the writing area of the first window at the cursor position without replacing the displayed definition within the list box of the second window.

2. The method of claim 1, wherein the list of available dictionary services include dictionaries in different languages including English, French, Italian, German and Spanish.

3. The method of claim 1, wherein providing the first option and the second option comprises displaying the first option and the second option within a drop down menu.

4. The method of claim 1, wherein entering the shorthand term to be defined directly from within the application further comprises selecting a shorthand term from within the application by highlighting the shorthand term.

5. The method of claim 1, wherein accessing the dictionary service, further comprises accessing at least one dictionary over a network that is searched.

6. The method of claim 5, wherein the available dictionary services include dictionaries other than shorthand dictionaries.

7. The method of claim 5, wherein displaying the definition of the shorthand term within the application further comprises making the definition selectable from within the application.

8. The method of claim 6, further comprising inserting the definition into the application when the definition is selected.

9. A computer-readable storage medium having computer-executable instructions for utilizing a shorthand term dictionary service, the instructions comprising:

initiating a shorthand dictionary service from within a document creation application;

entering a SMS shorthand term to be defined directly from within a document creation application; wherein the document creation includes a first window containing a writing area and a second window that includes a search box and a results area that are displayed in response to the shorthand dictionary service being initiated and after the first window is displayed;

determining when the shorthand term is entered in the search box of the second window; and when the shorthand term is entered within the search box of the second window performing actions, including:

accessing a dictionary service over a network;

obtaining a definition of the shorthand term;

providing the definition to the application; and displaying the definition of the shorthand term within the results area of the second window without replacing the entered SMS shorthand term; and inserting the definition into the writing area of the first window;

determining when the shorthand term is entered within the writing area of the first window and when the shorthand term is entered within the writing area of the first window, performing actions, including:

accessing the dictionary service over the network;

obtaining the definition of the shorthand term; and displaying the definition of the shorthand term within the results area of the second window.

10. The computer-readable storage medium of claim 9, wherein when the shorthand term is entered within the writing area further includes: receiving a selection of the definition of the shorthand term within the results area of the second window; in response to the selection of the definition of the shorthand term, providing a first option to insert the selected definition into the first window at a current cursor position within the writing area and providing a second option to copy the selected definition; determining when the first option is selected and when the first option is selected inserting the definition into the writing area of the first window at the cursor position without replacing the displayed definition within the list box of the second window.

11. The computer-readable storage medium of claim 9, wherein entering the SMS shorthand term to be defined directly from within the application further comprises highlighting the shorthand term.

12. The computer-readable storage medium of claim 8, wherein accessing the dictionary service, further comprises accessing at least one dictionary of shorthand terms.

13. The computer-readable storage medium of claim 12, further comprising displaying a list of available dictionary services and receiving a selection from the displayed list of available dictionary services that indicates the dictionary service to search for the shorthand term.

14. The computer-readable storage medium of claim 12, wherein displaying the definition of the shorthand term within the application further comprises making the definition selectable from within the application.

15. The computer-readable storage medium of claim 13, further comprising inserting the definition into the application when the definition is selected.

16. A system for a shorthand dictionary service, comprising:

a first computing device that is coupled to a network and that includes a dictionary service application that is configured to perform actions, including:

receiving a shorthand term from a second computing device; wherein the shorthand term is received directly from within an application on the second computing device having a writing area that is within a first window and a search box and a list box that is within a second window that is displayed in response to a shorthand dictionary service being initiated on the second computing device and after the first window is displayed;

determining when the shorthand term is entered in the search box of the second window; and when the shorthand term is entered within the search box of the second window performing actions, including:
    searching for a definition of the shorthand term within a dictionary; and
    providing a result within the list box of the second window based on the search; wherein the result is displayed within the application on the second computing device without replacing the shorthand term entered within the search box; and providing an option to copy the definition and insert the definition into the writing area of the first window; and
determining when the shorthand term is entered within the writing area of the first window and when the shorthand term is entered within the writing area of the first window, performing actions, including:
    obtaining the definition of the shorthand term within the dictionary; and
    displaying the definition of the shorthand term within the list box of the second window.

17. The system of claim 16, wherein when the shorthand term is entered within the writing area further includes: receiving a selection of the definition of the shorthand term within the results area of the second window; in response to the selection of the definition of the shorthand term, inserting the definition into the writing area of the first window at a current cursor position without replacing the displayed definition within the list box of the second window.

18. The system of claim 16, wherein the shorthand term is received directly from within the application on the second computing device, further comprises selecting the shorthand term from within writing area of the application by highlighting the shorthand term.

19. The system of claim 17, in response to the selection of the definition providing a first option to insert the selected definition into the first window at the current cursor position within the writing area and providing a second option to copy the selected definition.

20. The system of claim 19, wherein the dictionary is selectable by a user and wherein a list of dictionaries including dictionaries in different languages is included to be selectable.

21. The system of claim 20, further comprising replacing the shorthand term with the definition of the shorthand term in the writing area of the first window.

\* \* \* \* \*